United States Patent
Garra et al.

(10) Patent No.: US 8,170,231 B2
(45) Date of Patent: May 1, 2012

(54) ADJUSTABLE ACCESSORY FOR A PORTABLE COMMUNICATION DEVICE

(75) Inventors: LanTing L. Garra, Sunrise, FL (US); Vance M. McGary, Miami, FL (US); Craig F Siddoway, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 265 days.

(21) Appl. No.: 12/623,344

(22) Filed: Nov. 20, 2009

(65) Prior Publication Data

US 2011/0123050 A1 May 26, 2011

(51) Int. Cl.
*H04R 1/10* (2006.01)
*H04R 1/02* (2006.01)
*H04R 9/06* (2006.01)
*H04R 25/00* (2006.01)
*G09F 27/00* (2006.01)

(52) U.S. Cl. .......... 381/74; 381/124; 381/334; 381/375; 381/379

(58) Field of Classification Search ............ 381/123, 381/74, 334, 105, 124, 379, 375, 374; 242/388, 242/388.1, 388.2, 388.8; 439/577; 379/428.01, 379/431, 441, 447, 450
See application file for complete search history.

(56) References Cited

U.S. PATENT DOCUMENTS

| | | | |
|---|---|---|---|
| 6,542,757 B2 | 4/2003 | Bae | |
| 6,616,080 B1 * | 9/2003 | Edwards et al. | 242/378.1 |
| 7,086,512 B2 | 8/2006 | Shack et al. | |
| D542,026 S | 5/2007 | Gotlieb | |
| 7,574,361 B2 | 8/2009 | Yeager et al. | |
| 7,782,602 B2 | 8/2010 | Zhu | |
| 8,044,815 B2 | 10/2011 | Du et al. | |
| 8,090,130 B2 | 1/2012 | Zorkendorfer et al. | |
| 2003/0198355 A1 * | 10/2003 | Hong et al. | 381/74 |
| 2004/0022395 A1 * | 2/2004 | Turnbull | 381/74 |
| 2005/0210340 A1 | 9/2005 | Townsend et al. | |
| 2006/0013429 A1 * | 1/2006 | Ohta | 381/370 |
| 2006/0287006 A1 | 12/2006 | McLntyre et al. | |
| 2008/0204268 A1 | 8/2008 | Dowling et al. | |
| 2010/0155550 A1 * | 6/2010 | Weiss-Vons | 248/206.3 |
| 2010/0182507 A1 | 7/2010 | Haggis et al. | |

(Continued)

FOREIGN PATENT DOCUMENTS

EP        1839694 A1    10/2007

(Continued)

OTHER PUBLICATIONS

PCT International Search Report Dated May 19, 2011 for Counterpart Application PCT/US2010/052133.

(Continued)

*Primary Examiner* — Vivian Chin
*Assistant Examiner* — Douglas Suthers
(74) *Attorney, Agent, or Firm* — Barbara R. Doutre; Daniel R. Bestor (57) ABSTRACT

A user wearable accessory provides push-to-tall (PTT), microphone and adjustable electrical cord length features in a single device. First and second adjustable electrical cords couple a portable communication device to an earpiece. The accessory is formed of front and back housing portions coupled together to provide a spooling feature therebetween. The spooling feature accommodates the two electrical cords such that a user is able to wrap each cord to provide an overall desired length. Users of different heights can adjust the cord length as desired thereby minimizing tangling of the cords.

15 Claims, 11 Drawing Sheets

U.S. PATENT DOCUMENTS

2010/0244738 A1    9/2010    Aiso

FOREIGN PATENT DOCUMENTS

| KR | 20-0181930 Y1 | 5/2000 |
| KR | 10-2003-0065502 A | 8/2003 |
| KR | 10-0822725 B1 | 4/2008 |

OTHER PUBLICATIONS

PCT International Search Report Dated Jun. 10, 2011 for Related U.S. Appl. No. 12/622,961.

Office Action Dated Feb. 3, 2012 for Related U.S. Appl. No. 12/622,961.

* cited by examiner

ADJUSTABLE ACCESSORY FOR A PORTABLE COMMUNICATION DEVICE

RELATED CASE

This application is related to application Ser. No. 12/622,961, filed Nov. 20, 2009.

FIELD OF THE DISCLOSURE

The present disclosure relates generally to accessories for portable communication devices and more particularly to providing an improved user interface for accessories.

BACKGROUND

The interconnection between a portable communication device and an electronic accessory device is often through a wired interconnection cord. A number of user interface issues can present themselves when a wired accessory is coupled to a communication device, such as a two-way radio, worn on or about a user's body. For example, the wired interconnection cord typically comes in one length, leaving users of different heights unable to manage the cord length. Not only can the extraneous cord length be unattractive, but the excess cord length can get tangled or caught on objects causing the accessory or radio to be pulled off from the user's body. Designing additional features into portable electronic products worn on or about the user's body presents challenges in maintaining small and compact form factors as well as minimizing additional cost. Any extra weight or bulkiness should be avoided.

Accordingly, there exists a need for an improved accessory user interface for use with a portable communication device, such as a two-way radio.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to providing an improved user interface for an accessory of a portable communication device. The present disclosure is directed towards providing an accessory that is lightweight and user friendly without bulkiness or additional weight.

Briefly, a user wearable accessory provides a push-to-talk (PTT) button, a microphone and adjustable electrical cord length features in a single device. The accessory's adjustable cord couples a portable communication device to a remote speaker or earpiece. The accessory provides a spooling feature about which to wind two electrical cords. A user is able to wrap each electrical cord to a desired length. Thus, users of different heights can adjust the overall cord length as desired thereby minimizing tangling of the cord.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
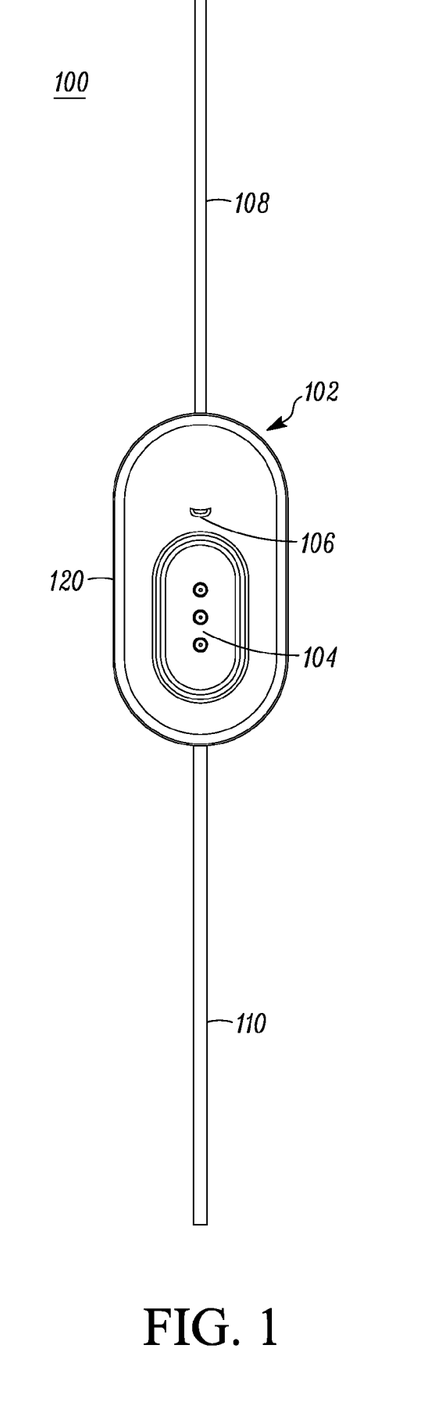
FIGS. 1 and 2 are front and back views of an accessory formed in accordance with some embodiments.
Figure 2:
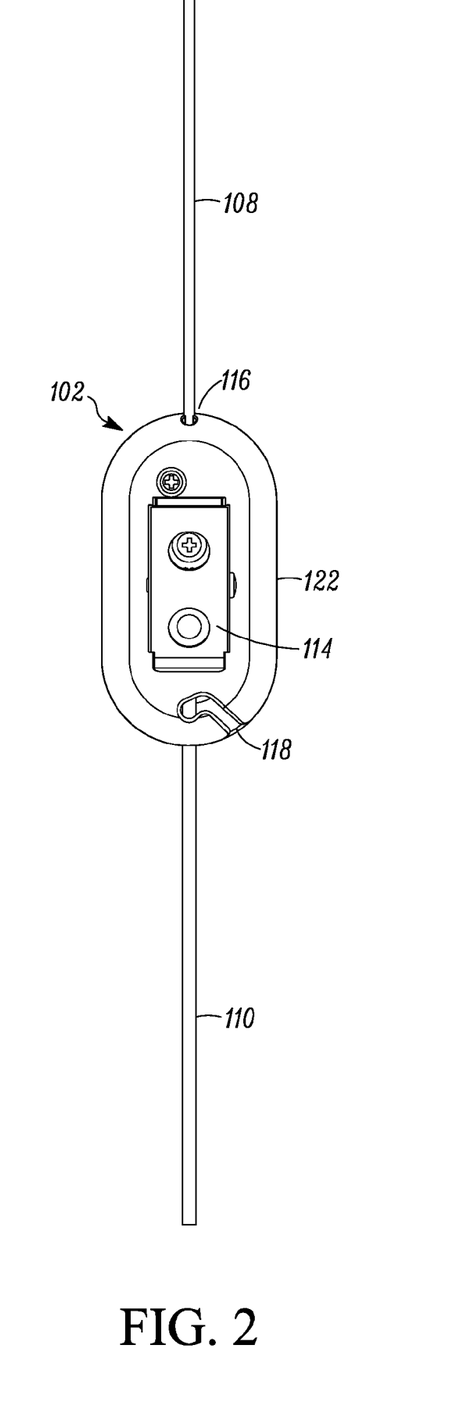

FIGS. 1 and 2 illustrate front and back views of an accessory 100 formed in accordance with some embodiments. Accessory 100 provides an interface between a portable communication device (shown later) and another accessory, such as a remote speaker or earpiece (shown later). Accessory 100 comprises a housing 102 having front and back housing portions 120, 122 respectively. Accessory 100 includes a push-to-talk button (PTT) 104 and a microphone port 106 coupled to the front housing portion 120. As seen in FIG. 2, the back housing portion 122 comprises a clip 114. Clip 114 may be used to attach the accessory 100 to a user's garment, such as a shirt pocket, belt, or collar. In accordance with an embodiment, accessory 100 provides PTT functionality, microphone functionality and user controllable adjustable electrical cord length. Back housing portion 122 further includes first and second cord retention features 116, 118, shown here as recessed openings forming first and second notches. These first and second cord retaining features 116, 118 are used to capture and retain the first and second cords 108, 110 once their relative lengths have been adjusted as desired by a user (shown in later views).

Figure 3:
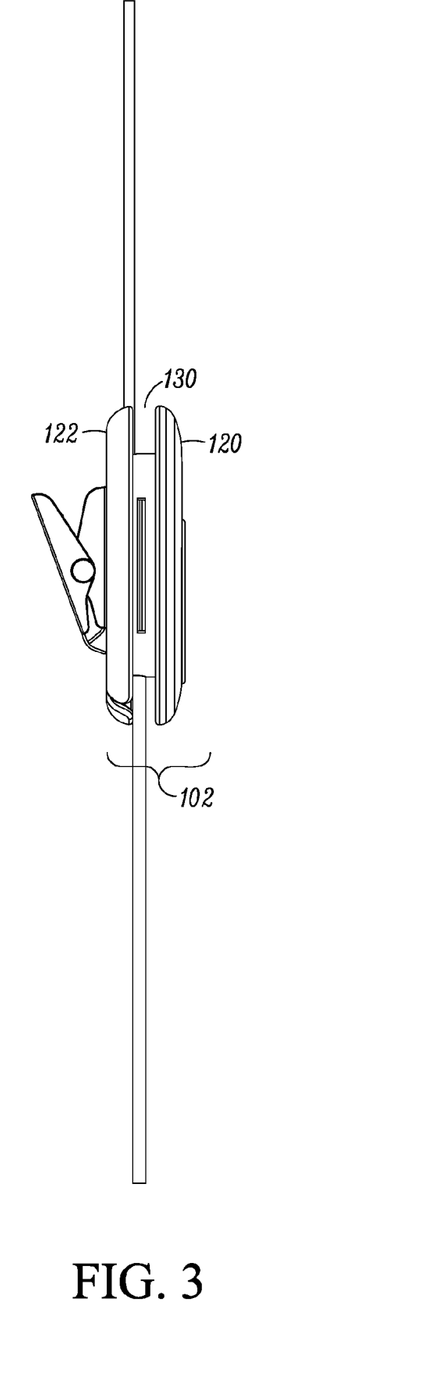
FIGS. 3 and 4 are side views of the accessory formed in accordance with some embodiments.
Figure 4:
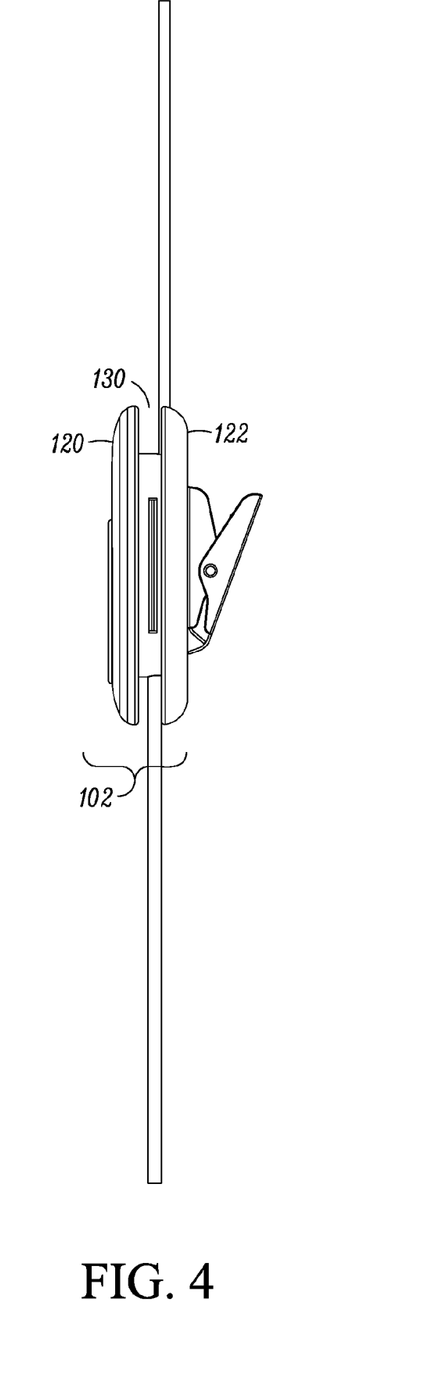

In accordance with an embodiment, FIGS. 3 and 4 illustrate first and second side views of accessory 100 formed in accordance with various embodiments. The front and back housing portions 120, 122 are coupled together to form a spooling feature 130 therebetween. The spooling feature accommodates the electrical cords 108, 110 such that a user is able to independently wrap each cord to a desired length. Users of different heights can adjust the cord lengths as desired thereby eliminating tangling of the cord.

Figure 5:
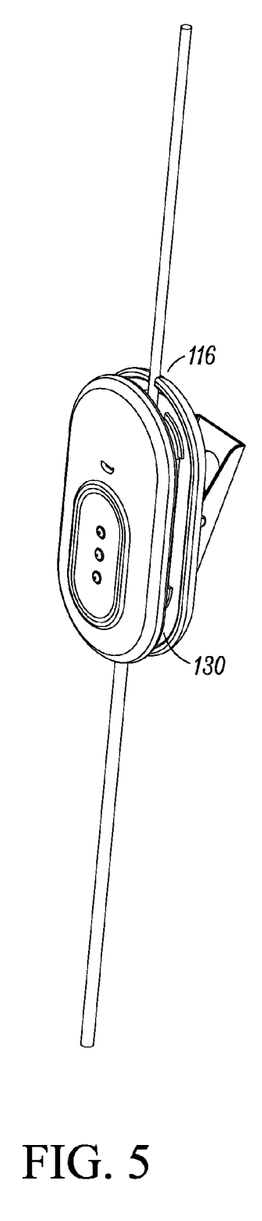
FIGS. 5 and 6 are front and back perspective views of the accessory in accordance with some embodiments.
Figure 6:
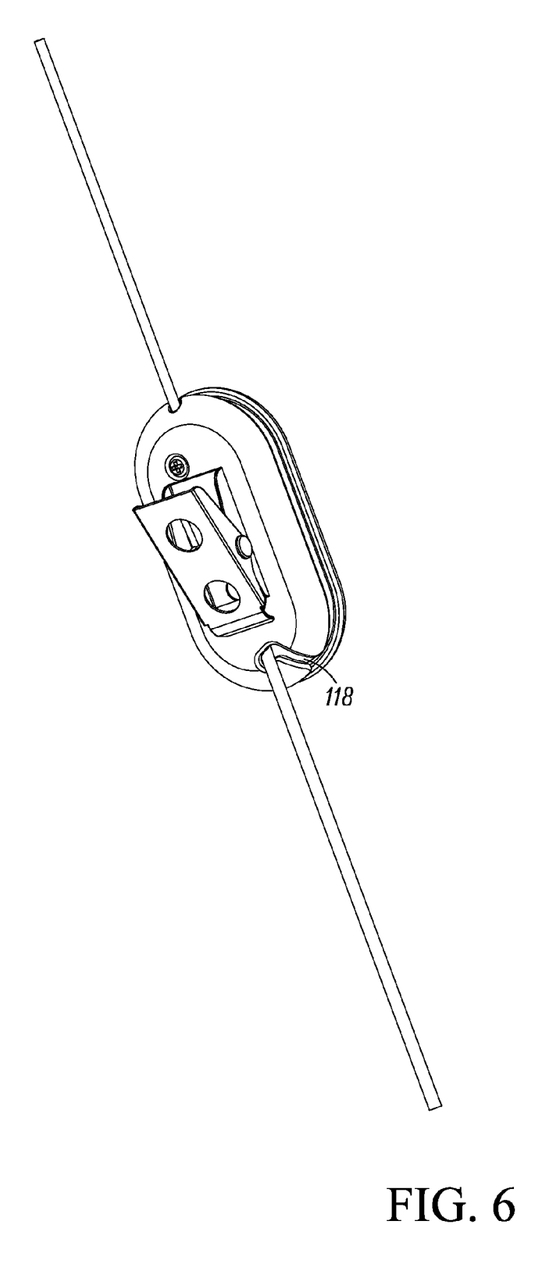

Referring to FIGS. 5 and 6 there are shown front and back perspective views of accessory 100 in accordance with some embodiments. These views further illustrate the spooling feature 130 formed between the front and back housings 120, 122 and the cord retention features 116, 118. The first and second adjustable cord lengths are independently adjusted by independently winding the first and second electrical cords 108, 110 about spooling feature 130. The cords are secured to the spooling feature 130 by retention features 116, 118.

In accordance with some embodiments, the first cord 108 includes interconnect wires for a speaker (speaker+, speaker−), as will be shown later. The second cord 110 includes interconnect wires for speaker, microphone and external PTT (speaker+, speaker−, mic+, mic− (GND), and ext PTT). Thus, cord 108 is shown as being thinner than cord 110 due to fewer interconnect wires.

Figure 7:
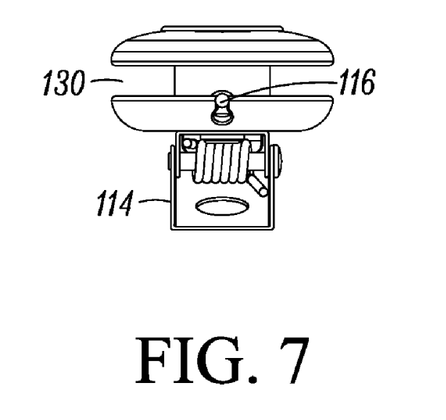
FIGS. 7 and 8 are top and bottom views of the accessory in accordance with some embodiments.
Figure 8:
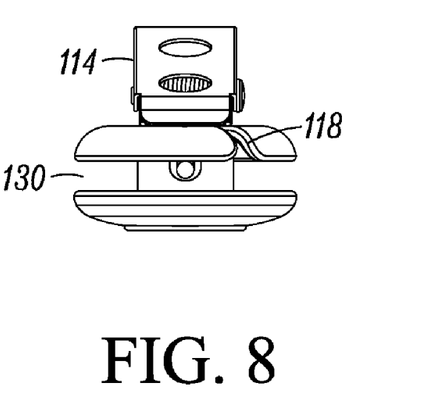

In accordance with some embodiments, FIGS. 7 and 8 show top and bottom views of accessory 100. The cord retention features 116 and 118 are shown formed within the back housing 122, but alternatively could also be formed on the front housing portion 120 or possibly one retention feature could be located on the front housing and the other retention feature could be located on the back housing. The retention features are sized to accommodate the diameter of their respective cord. As such, second cord retention feature 118 accommodates the wider diameter cord 110. The retention features 116, 118 should be designed to capture and secure each cord without piercing the sleeve of the wire. Clip 114 may be any appropriate clip, such as a spring loaded clip, preferably having rotation capability, to provide attachment of the accessory 100 to a user's garment, such as a shirt pocket, belt, or collar.

Figure 9:
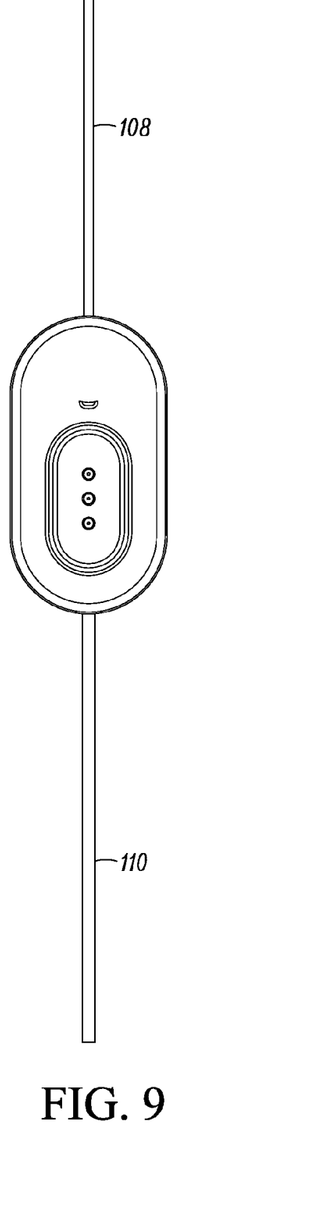
FIGS. 9 and 10 illustrate the accessory coupled between two electronic devices in accordance with some embodiments.
Figure 10:
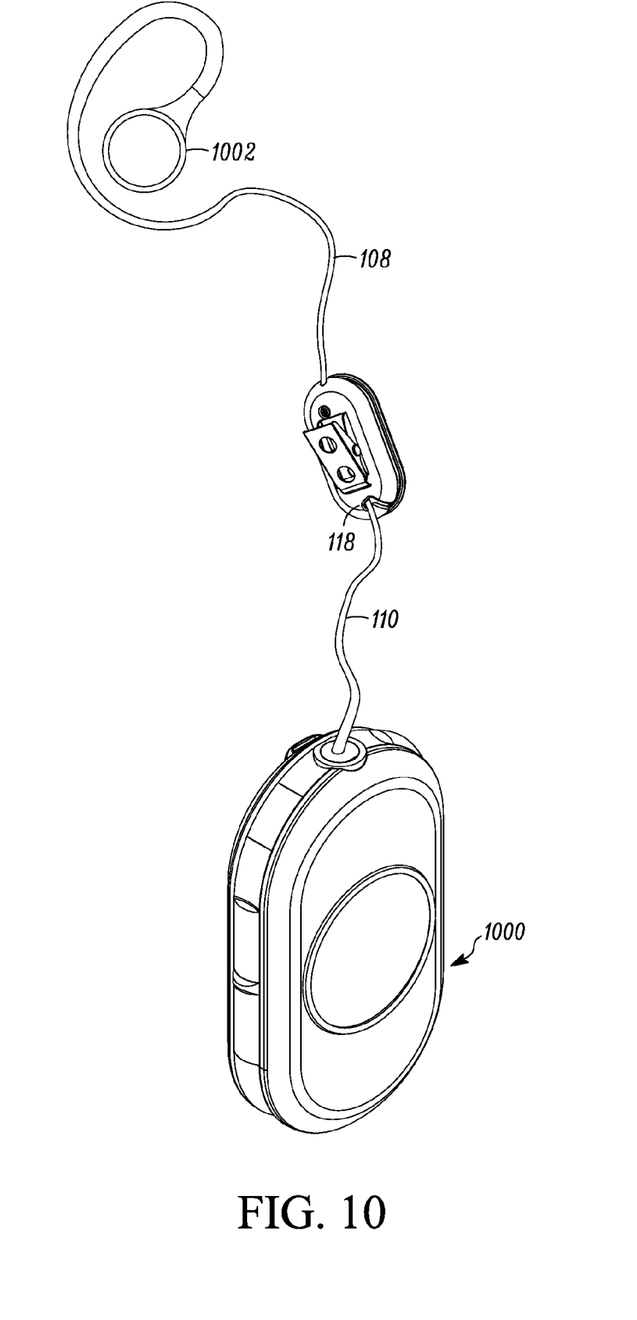
Figure 11A:
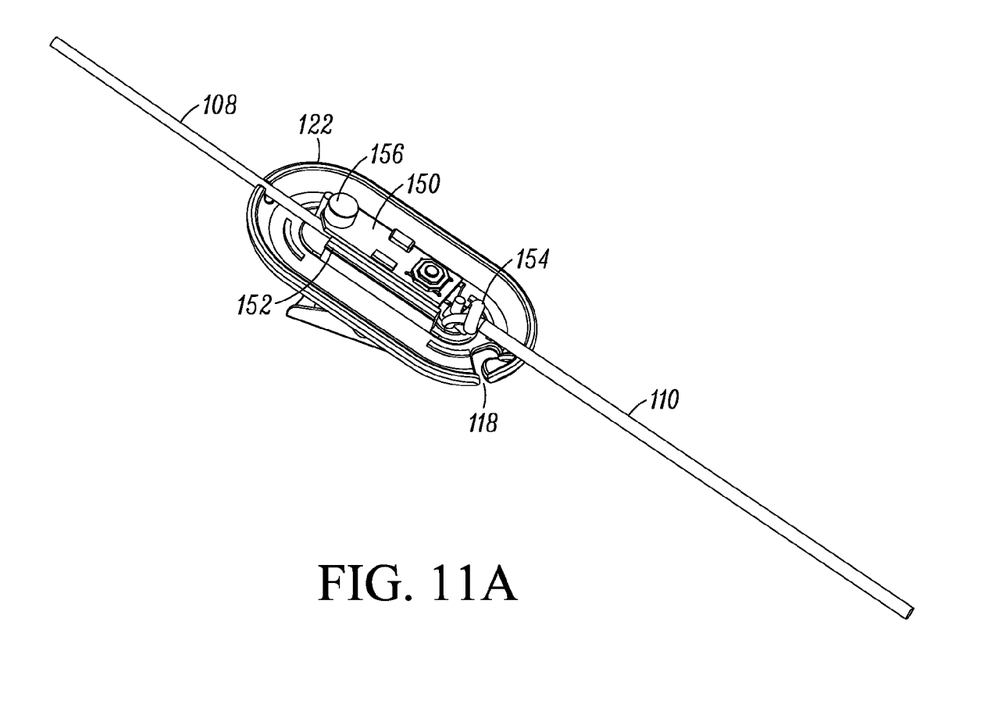
FIGS. 11A, 11B, 11C, 11D, 11E, 11F and 11G show a plurality of views of a back housing portion of the accessory in accordance with some embodiments.
Figure 11B:
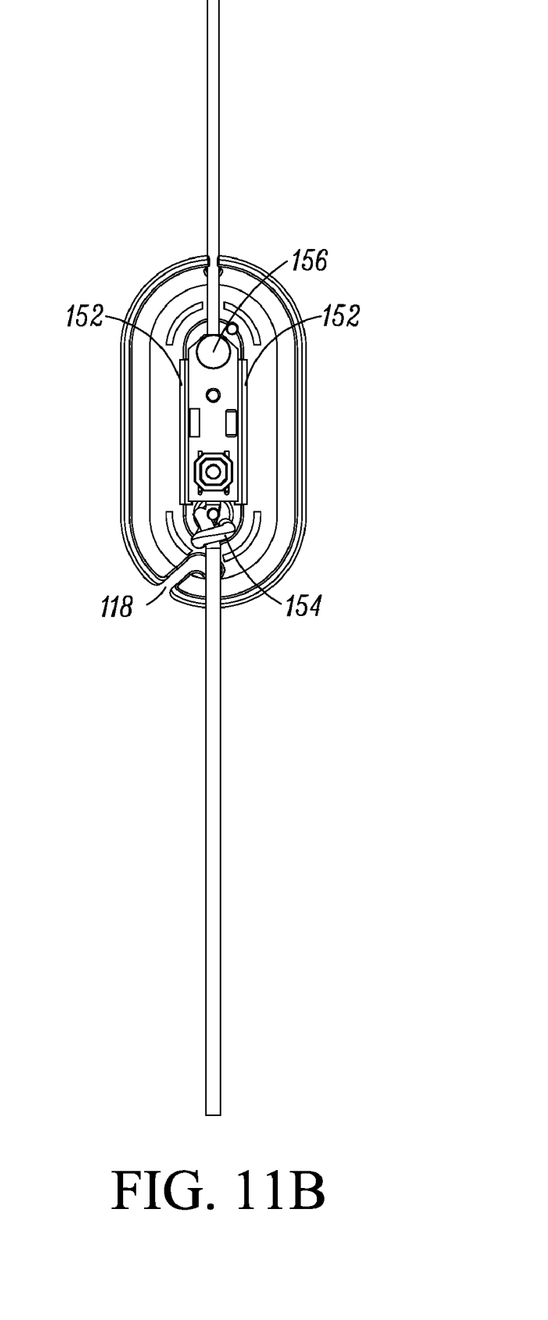
Figure 11C:
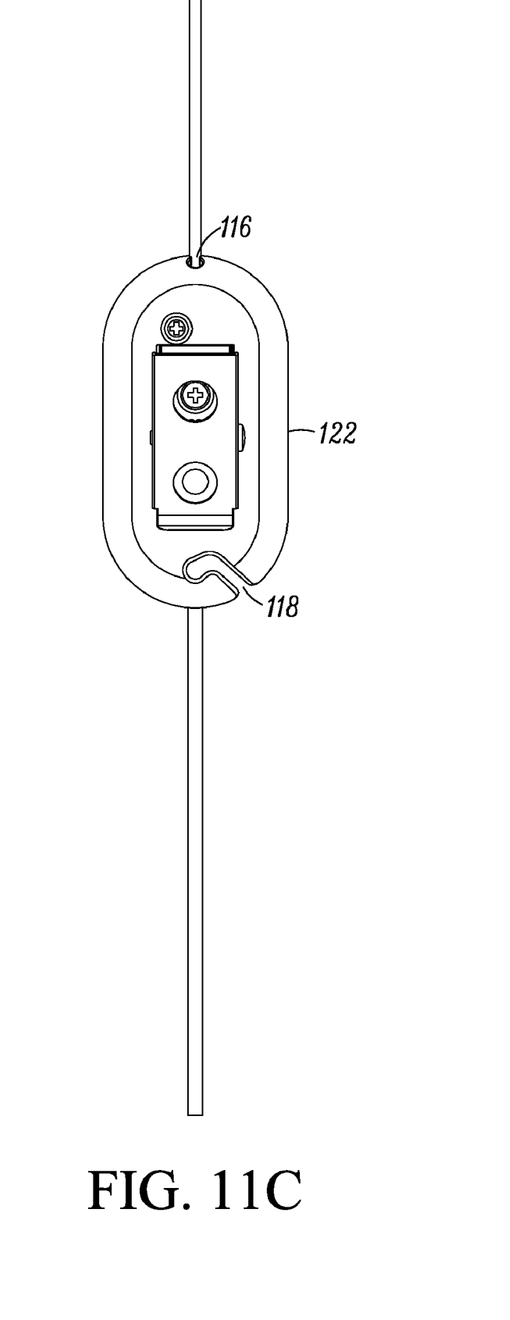
Figure 11D:
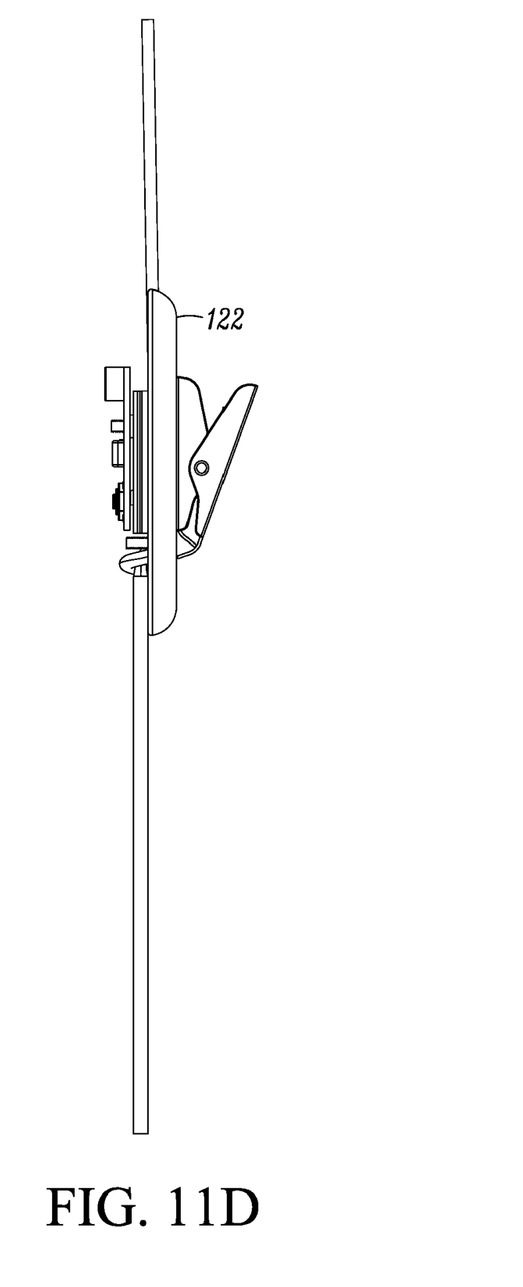
Figure 11E:
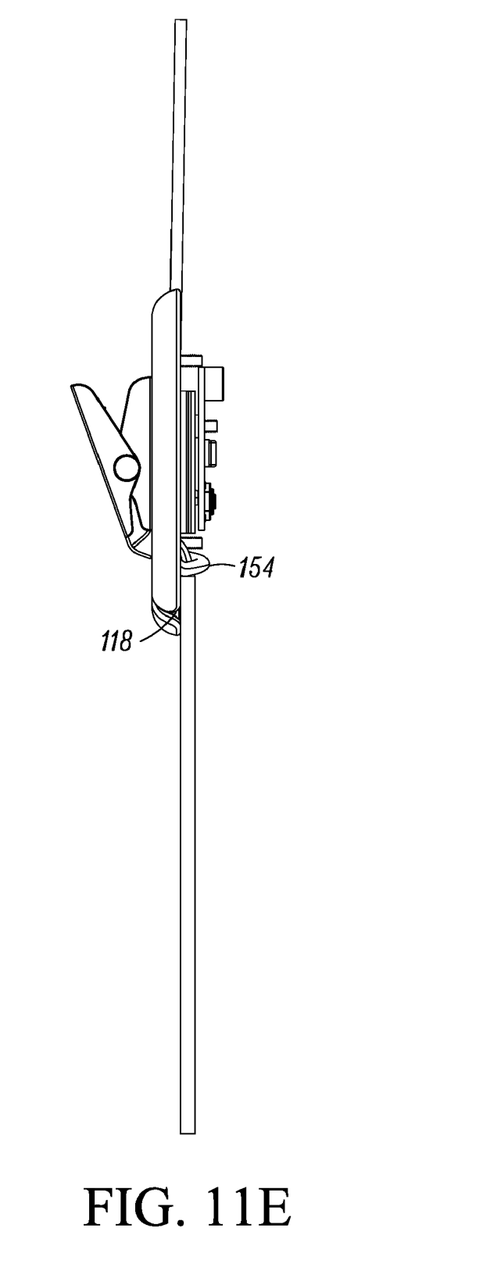
Figure 11F:
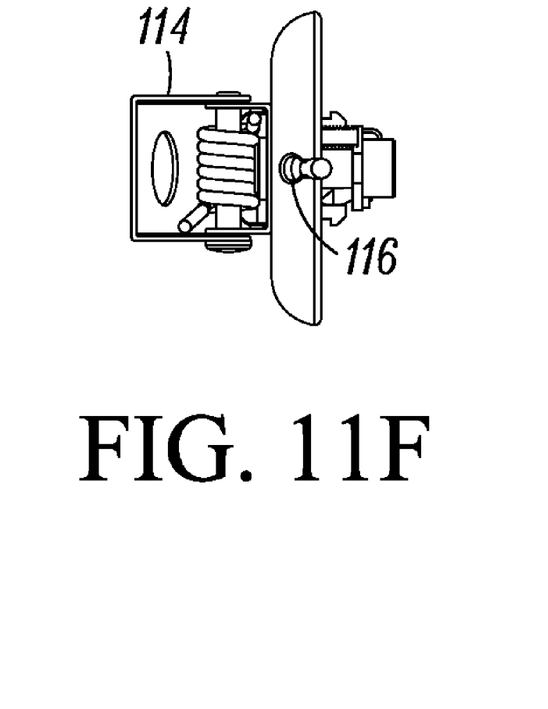
Figure 11G:
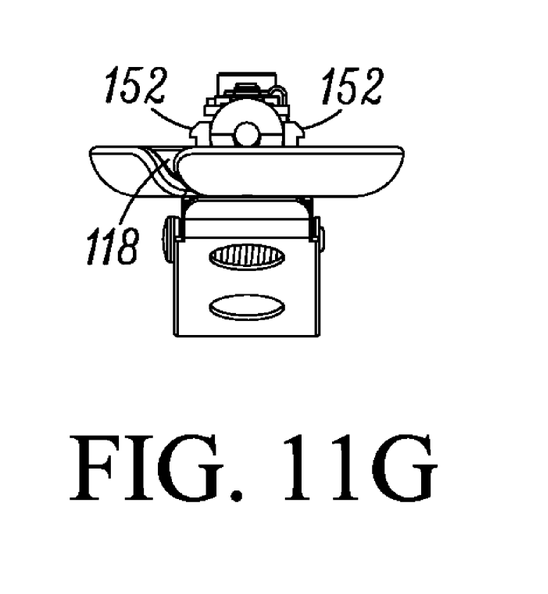

Referring now to FIGS. 9 and 10, the accessory 100, formed in accordance with the various embodiments, is coupled to portable radio 1000 and an earpiece 1002. In this embodiment, the portable radio 1000 has a controller and transceiver circuitry but does not include a microphone or speaker. As seen in FIG. 9, the first cord 108 comprises a narrower diameter than the second cord 110. This difference in cord diameter is due to the earpiece 1002 utilizing only speaker interconnections while the accessory utilizes speaker, microphone, and PTT connections. The first and second cords 108, 110 can be wound in any direction about the spooling feature 130. Thus, one cord can be wound clockwise, and the other cord can be wound counterclockwise, or both cords can be wound in the same direction.

The first electrical cord 108 is wound about the spooling feature 130 and electrically coupled to the earpiece 1002. The second cord 110 is wound about the spooling feature 130 and electrically coupled to the portable communication device. Again, the first and second cords 108, 110 provide an electrical interface between the portable communication device and the earpiece as well as the portable communication device to the PTT and microphone. The first and second cord retention features 116, 118 formed within the housing capture and retain the first and second cords 108, 110 adjusted to first and second cord lengths. Clip 114 coupled to the second housing portion allows the user to attach the accessory 100 to a garment worn by the user.

FIGS. 11A, 11B, 11C, 11D, 11E, 11F and 11G show a plurality of views of the back housing portion of the accessory in accordance with some embodiments. These views show back housing portion 122 opened up with a substrate, such as a printed circuit board (PCB) 150 seated therein. PCB 150 includes a microphone cartridge 156 and other electronic circuitry for PTT and speaker. The electrical cords 108 and 110 are coupled to the PCB 150, with cord 110 providing external PTT, microphone and speaker up to PCB 150. Cord 108 provides speaker interconnectivity from the PCB 150 to a remote speaker, such as an earpiece. Wing features 152 are formed on interior side walls of back housing portion 122 along either side of the PCB 150. The wing features 152 are used to capture front housing portion 120. Cord 110 is knotted at knot 154 within the back housing portion 122. While not seen in this view, cord 108 is similarly knotted on the other side of PCB 150. Each knot 154 provides strain relief for its respective cord to prevent the cord from being inadvertently pulled too far out from the completed housing 102. The cord length is set by first and second cord retention features 116, 118. The cord retention features are shown formed as cut outs in the back housing portion 122. One cord retention feature 116 is shown as a straight cut notch, and the other cord retention feature 118 is shown as a curved notch within housing portion 122, but other configurations are possible as well.

Figure 12A:
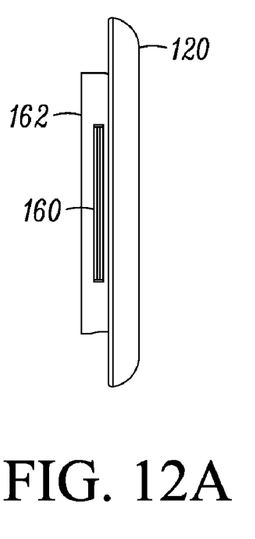
FIGS. 12A and 12B show first and second side views of a front portion of the accessory formed in accordance with various embodiments.
Figure 12B:
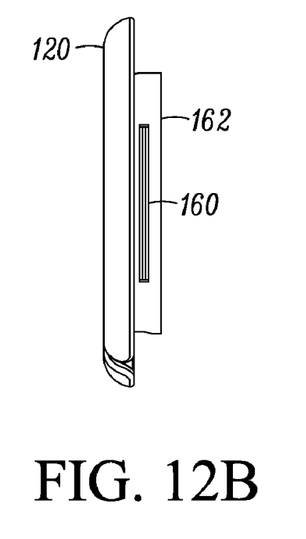

FIG. 12 shows the front housing portion 120 including an interior side wall 162 having first and second slots 160 for receiving the wing features 152 of the back housing portion 122. When the front housing portion 120 is coupled to the back housing portion 122, wing features 152 of the back housing portion 122 are snapped into slots 160, thereby forming the spooling feature 130 that can be seen in the views of FIGS. 3 and 4. The first and second slots 160 thus provide an alignment feature for receiving corresponding wing features 152 coupled to the back housing portion 122. The wing features 152 align and snap into the slots 160 to couple the front and back housing portions 120, 122 together thereby forming the spooling feature 130.

Figure 13:
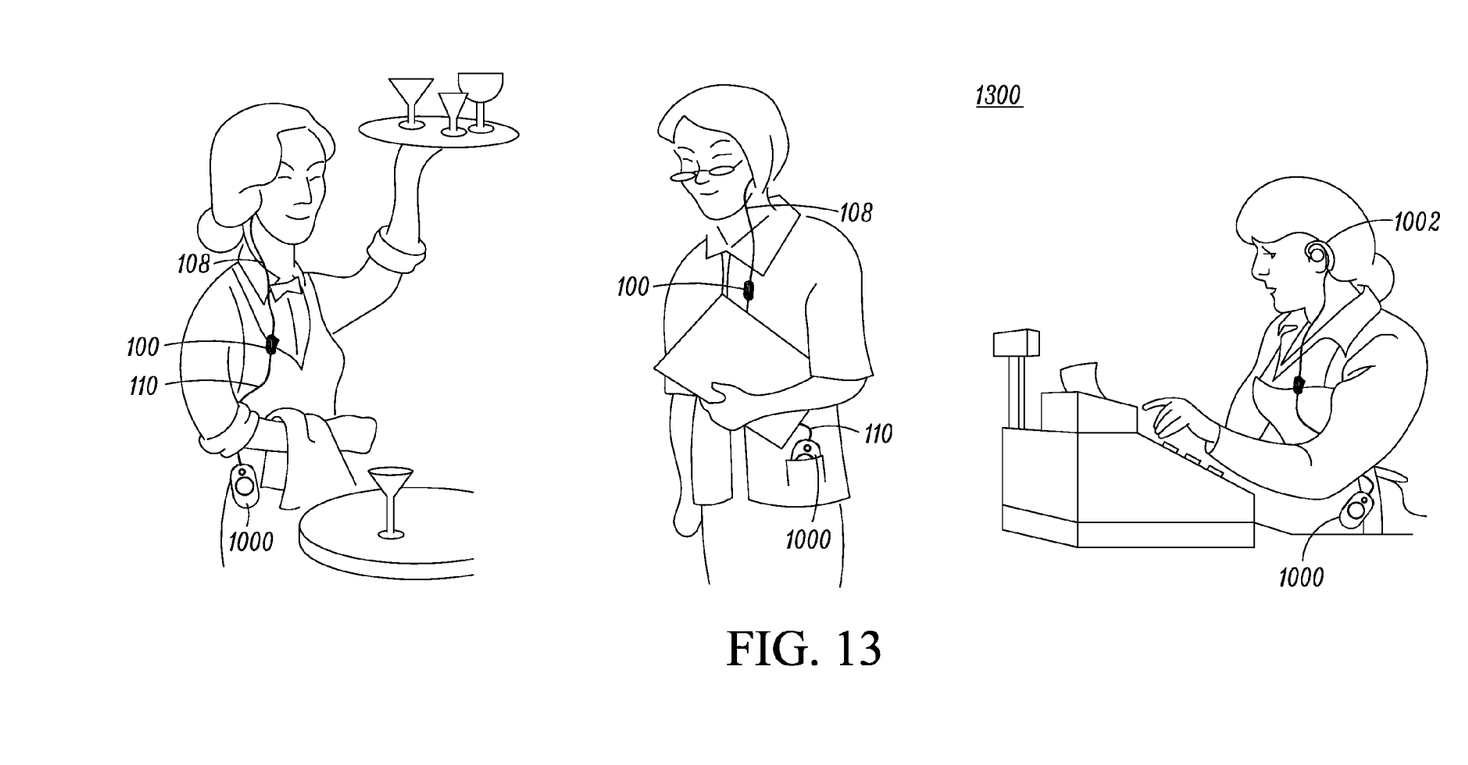
FIG. 13 shows a plurality of accessories formed in accordance with the various embodiments operating in a business environment.

FIG. 13 illustrates a plurality of accessories 100 formed in accordance with the various embodiments operating in a business environment 1300, such as retail or restaurant environment. In the embodiment of FIG. 13, each accessory 100 couples portable radio 1000 to earpiece 1002. In this embodiment, portable radio 1000 has no speaker and no microphone and as such, a user is now able to focus primarily on utilizing the accessory 100 and earpiece 1002 as their primary means of communicating. The spooling feature 130 allows the user to adjust the length of cords 108 and 110 thereby eliminating any tangling of the cords and minimizing the risk of having the cords catch on external objects. Clip 114 can be also used to secure accessory 100 to the user's garment if desired. Allowing the user to focus on using the accessory 100 in conjunction with earpiece 1002 provides an unobtrusive, lightweight wearable communication system that is well suited for the business environment.

Accordingly, there has been provided an accessory which provides PTT, microphone and cord management all in one user wearable device. The cord management system allows users of different heights to adjust the position of the accessory according to their preference and eliminates tangled cords. Multiple users, such as employees within a retail or restaurant environment, can use the same device and adjust it according to their own preferences.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized controllers (or "controlling devices") such as microcontroller, customized controllers and unique stored program instructions (including both software and firmware) that control the one or more controllers to implement, in conjunction with certain non-controller circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. An accessory for a portable communication device, comprising:
   a housing having front and back housing portions coupled together to form a spooling feature therebetween and having first and second cord retention features formed in an outer rim of one of the front and back housing portions, the housing enclosing a circuit substrate disposed therein;
   a first cord coupled to the spooling feature and configured to pass a speaker signal to between the circuit substrate and a speaker, the first cord having an intermediate portion thereof retained in the first cord retention feature, and being sized relative to the first cord retention feature to be received and secured by the first cord retention feature;
   a second cord coupled to the spooling feature and configured to pass a set of signals between the circuit substrate and a portable communication device, the second cord having an intermediate portion thereof retained in the second cord retention feature, and being sized relative to the second cord retention feature to be received and secured by the second cord retention feature;
   a clip, a push-to-talk (PTT) switch, and a microphone coupled to the housing, the second cord configured to provide an electrical interconnection between (i) the PTT switch, microphone, and speaker and (ii) the portable communication device; and
   the accessory providing PTT functionality, microphone functionality and user controllable adjustable cord lengths about the spooling feature via independent manual windings of the first and second cords about the spooling feature and a securing of the first and second cords via respective first and second cord retention features.

2. The accessory of claim 1, wherein the first cord retention feature is a straight cut notch and the second cord retention feature is a curved notch.

3. The accessory of claim 2, wherein the first cord comprises a wider diameter than the second cord, and the first and second cord retention features are formed of different sized notches to retain the respective first and second cords.

4. The accessory of claim 1, further comprising;
   first and second slots formed in the front housing portion, the first and second slots providing an alignment feature; and
   first and second wing features coupled to the back housing portion, the first and second wing features aligning with and snapping into the first and second slots thereby coupling the front housing portion and the back housing portion together and forming the spooling feature therebetween.

5. A portable communication system, comprising:
   a portable radio comprising a controller and transceiver circuitry;
   a remote speaker; and
   an accessory coupled to the portable radio and the remote speaker and having push-to-talk (PTT) and microphone capability, the accessory comprising:
      a housing having front and back housing portions coupled together to form a spooling feature therebetween and having first and second cord retention features formed in an outer rim of one of the front and back housing portions, the housing enclosing a circuit substrate within;
      a first cord coupled to the spooling feature and configured to pass a speaker signal between the circuit substrate and the remote speaker, the first cord having an intermediate portion thereof retained in the first cord retention feature, and being sized relative to the first cord retention feature to be received and secured by the first cord retention feature;

a second cord coupled to the spooling feature and configured to pass a set of signals between the circuit substrate and the portable radio, the second cord having an intermediate portion thereof retained in the second cord retention feature, and being sized relative to the second cord retention feature to be received and secured by the second cord retention feature;

a clip, a push-to-talk (PTT) switch, and a microphone coupled to the housing, the second cord configured to provide an electrical interconnection between (i) the PTT switch, microphone, and speaker and (ii) the radio;

the accessory providing PTT user controllable adjustable cord lengths about the spooling feature via independent manual windings of the first and second cords about the spooling feature and a securing of the first and second cords via respective first and second cord retention features.

6. The portable communication system of claim 5, wherein placement of the portable radio, accessory and remote speaker are adjusted in response to adjusting the first and second electrical cord lengths.

7. The portable communication system of claim 6, wherein the remote speaker comprises an earpiece for placement about a user's ear.

8. The portable communication system of claim 5, wherein the clip is configured to attach to a garment worn by a user.

9. The portable communication system of claim 5, wherein the portable radio has no microphone and no speaker.

10. The portable communication system of claim 5, wherein the first electrical cord is tied at one end with a knot and wherein the second electrical cord is tied at one end with a knot within the accessory.

11. The portable communication system of claim 5, wherein the first electrical cord comprises two interconnect wires for the remote speaker and the second adjustable electrical cord comprises five interconnect wires for speaker (+/−), microphone (+/−) and external PTT.

12. The portable communication system of claim 5, wherein the first and second electrical cords are independently windable in any direction about the spooling feature.

13. The portable communication system of claim 5, wherein the accessory housing further comprises:
first and second slots formed in the front housing portion, the first and second slots providing an alignment feature; and
first and second wing features coupled to the back housing portion, the first and second wing features aligning with and snapping into the first and second slots thereby coupling the front housing portion and the back housing portion together and forming the spooling feature therebetween.

14. The portable communication system of claim 5, wherein the first cord retention feature is formed in a portion of the housing closest the remote speaker, and the second cord retention feature is formed in a portion of the housing closest the portable radio.

15. The portable communication system of claim 5, wherein the first cord retention feature is a straight cut notch and the second cord retention feature is a curved notch.

* * * * *